Patented Feb. 20, 1951

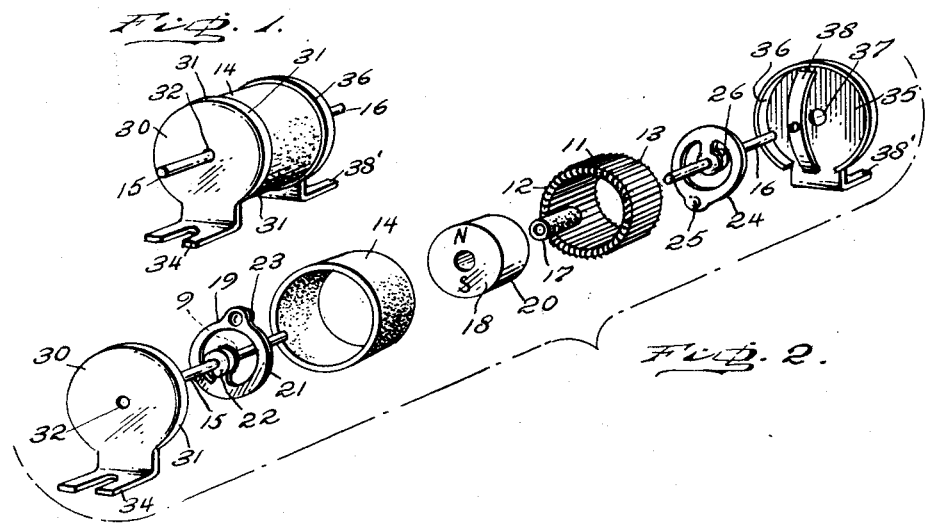
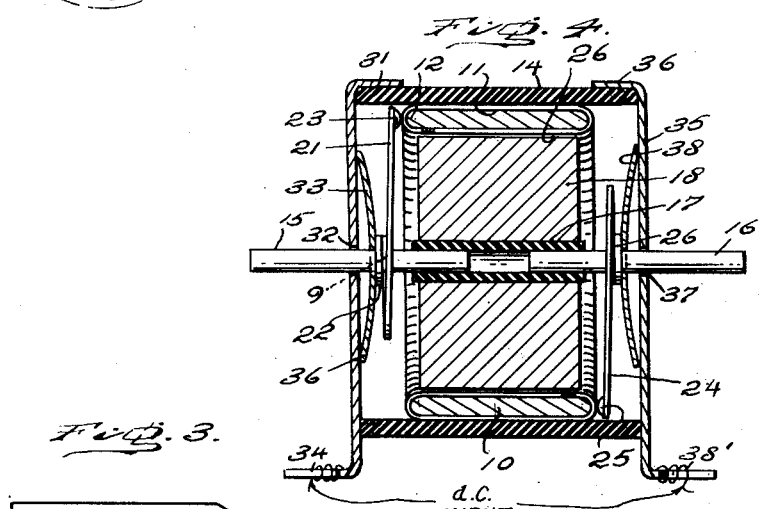
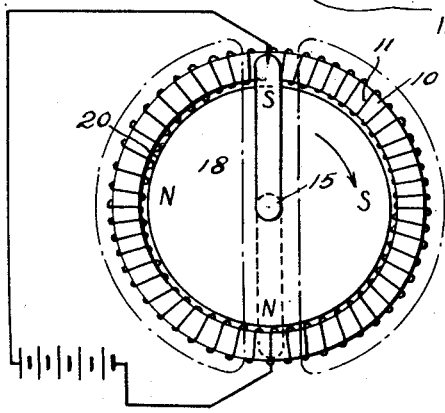
INVENTOR
JOSEPH C. CLARK

2,542,959

UNITED STATES PATENT OFFICE 2,542,959

MINIATURE ELECTRIC MOTOR

Joseph C. Clark, Merchantville, N. J., assignor to Jeny Corporation, Merchantville, N. J., a corporation of New Jersey Application March 15, 1949, Serial No. 81,521

2 Claims. (Cl. 172—36)

This invention relates to electric motors, and particularly to miniature motors.

It is among the objects of the invention: to provide a miniature motor of extreme economy of manufacture and of small size; to provide a motor of simplicity and small number of parts; to provide a miniature motor of extraordinarily high starting torque; to provide a miniature motor of high rotational speed; to provide a miniature motor of rugged parts and long life; and other objects and advantages will become more apparent as the description proceeds.

In carrying out the invention in a preferred embodiment a stationary toroid cored electromagnetic coil is provided, the coil of which has two transversely spaced peripheral wiping areas. Two axially aligned relatively insulated interlocked shafts are provided in concentric relation to the coil, and two relatively insulated brushes are mounted on the shafts for radial projection from the common axis diametrically thereof in opposite directions to engage the respective wiping areas with substantially 180° mutual angular spacing so that with a D. C. supply leading to the respective shafts and to the brushes and thence to the coil two paths are established through the coil which induce two flux fields and locate the respective poles of an electromagnetic flux adjacent to the instantaneous point of contact between the respective brushes and said coil. As the brushes rotate with the shafts about the common axis of the latter the magnetic fields and the respective poles thereof also rotate and progressively change their angular disposition relative to the toroid coil. A cylindrical permanent magnet is disposed within the toroid coil mounted on said shafts for rotation therewith, with the permanent poles thereof predeterminedly and permanently staggered relative to the said electromagnetic poles, such staggering, for equal efficiency in reversal of running, being preferably 90°. The whole is so arranged that when properly coupled to a source of D. C. a high starting torque is created between the cylindrical permanent magnet and the instantaneously fixed electromagnetic poles, followed instantaneously by a quick start and attainment of high running speed as the rotating electromagnetic poles of the stationary electromagnet respectively attract and repel the complementary respective poles of the permanent magnet rotating in synchronism therewith.

In the accompanying drawings forming part of this description:

Fig. 1 represents a perspective of the miniature motor according to the present preferred embodiment thereof.

Fig. 2 represents an exploded perspective of the motor.

Fig. 3 represents a diagram of the polarity and torque forces developed by the motor when energized by D. C.

Fig. 4 represents a transverse vertical section through the motor.

The foundation of the motor is a torus core 10 of ferrous material formed as a preferably continuous closed hollow band or sleeve generally oval in transverse section, and wound with at least one closely wrapped layer of wire 11, continuous through 360° of the core, extending completely about the core and conforming to the shape of the latter. The wire used is preferably enameled wire. The ends of the wire coil may be left open or separated, or, and preferably, they are joined to form a closed coil. The assembly of coil and core forms a toroid electromagnet as the stator of the motor. At suitable peripheral areas, illustratively on the lateral side edges of the wire coil, the enamel is removed as by a wire brush or the like, to form oppositely presenting brushing areas, respectively 12 and 13. The stator is mounted frictionally, or by adhesives, centrally in an insulating sleeve 14, as of vulcanized fiber, Bakelite or the like.

The rotor of the motor comprises two axially aligned shafts 15 and 16, rigidly anchored in relatively insulated relation, as by insertion into an insulating sleeve 17 holding the shafts in axially spaced relation so as to cause them to be electrically out of mutual contact. An annular or cylindrical permanent magnet 18 is mounted rigidly but insulatedly on shafts 15 and 16, as by being forced on the insulating sleeve 17. The magnet mass 18 is of such diameter and circumference that its external circumferential periphery 20 has a negligible clearance from the juxtaposed inner surface of the coil 11 when axially positioned therein. The permanent magnet has a north pole N and a south pole S, respectively diametrically opposite to each other close to the outer surface 20 of the magnet. The respective shafts each carry a separate brushing element for engaging the toroid coil. Shaft 15 carries a brush 21, secured to the shaft by a collar 22, so that the shaft, collar and brush all rotate together, with the brush in fixed angular relation to the shaft 15. The brush may be of any desired wiping contact-making construction, but is preferably formed with an arcuate evenly pressed endless wiping member 19 stamped out of a disc of thin brass or copper eccentric to an aperture 9 to fit over shaft 15 and disposed for biasing to engage the wiping surface 12 of the stator toroid coil. Preferably a wiping boss or rib 23 is formed in wiping member 19 of the brush on a radius of the shaft opening 9 for antifriction purposes and to secure localized current transfer. The rib or boss 23 is on a radius normal to the diameter upon which the respective poles of the permanent magnet are disposed, so that angularly the rib or boss 23 is 90° from the respective poles of the magnet. Of course, this degree of stagger is illustrative and preferred, especially where equal torque is desired in either direction of running, but, as will be seen, useable results attach to other degrees of stagger.

The shaft 16 also carries a brush 24 formed identically with brush 21, having a wiping rib or boss 25, and mounted on the shaft 16 by means of a collar 26. The latter brush extends radially from shaft 16 in the opposite direction from brush 21, so that the center of the bosses 23 and 25 are diametrically oppositely disposed, as well as axially offset, so that the boss 25 of brush 24 is also spaced the illustrative 90° from both poles of the permanent magnet. End housing elements are provided, comprising at one end, end plate 30, having an interrupted annular flange 31, and arranged for telescopic supporting relation to the fiber sleeve 14, and the plate 30 has an axial bearing opening 32, to receive and rotatably support shaft 15. A spring washer 33 is preferably provided bearing against the inner face of the end plate 30 and against the collar 22, so as to continuously conduct current from the plate 30 into the brush 21. The end plate 30 has a supporting foot portion struck out as the interruption of the flange 31, as an offset yoke 34, by which, for instance, connections to a source of current, such as the pole piece of a dry cell battery or the like, can be made; or it can also be used for anchoring the motor to a desired element. At the opposite axial end of the motor a complemental end housing element is provided, comprising the end plate 35, having the inwardly extending interrupted flange 36, also having telescopic relation to the opposite end of the fiber sleeve 14, and having an axial bearing opening 37 to receive and rotatably support shaft 16. A second spring washer 38 is preferably provided bearing against the inner face of the end plate 35 and against the collar 26, so as to continuously conduct current from the plate into the brush 24. End plate 35 has a supporting foot portion as an offset yoke 38', by which connections can be made to the opposite line of the current supply, such as the illustrative dry cell mentioned. The assembly being completed, the end plate members are secured to the fiber housing 14 by suitable adhesives, or the like.

When the feet are connected to the respective poles of a battery or the like, current is delivered to the respective brushes and passes into the coil through the juxtaposed wiping areas thereof. As the current divides at the point of contact of the brushes carrying the input and half of the current flows in each direction through the toroid coil, from the input brush to and out through the other brush, this establishes two adjacent flux fields which create a magnetic pole adjacent to each brush, each depending for its polarity of course, on the direction of current flow through the coil. Whichever the instant electromagnetic pole may be and wherever it appears on the stator, it is angularly staggered away from the permanent magnet pole to which it is attracted and away also from that which it repels. Conversely the opposite electromagnetic pole wherever it appears on the stator is also angularly staggered away from the permanent magnet pole to which it is attracted and also away from that which it repels. The degrees of stagger may be of any value desired, but it is preferred to maintain 90° spacing, as this represents the optimum torque condition, and especially in a reversible motor. The result is immediate high torque on the rotor as the permanent magnet is pulled or urged angularly toward the electromagnetic poles to which its respective poles are simultaneously attracted, and the rotor starts to move angularly. Of course, as the brushes are anchored to the rotor they also start to move and the electromagnetic poles continue to be formed at the preferred 90° in advance of the advancing permanent magnet poles so that rotor continues to run at high speed and with high efficiency. Of course, the permanent magnet need not be a cylindrical mass, although this is preferred, as a bar magnet would be useable in the connection.

The simplicity, smoothness, and high starting torque of the motor will be appreciated.

Having thus described my invention, I claim:

1. A motor comprising a toroidal core and a coil wound on said core, a sleeve of insulating material enclosing said core and coil to support same, a rotor comprising two shafts in axial alignment in electrically spaced relation, a cylindrical permanent magnet mounted insulatedly on said shafts to rotate therewith, brushes mounted on the respective shafts and extending diametrically in opposite directions therefrom, said brushes being fixed relative to the permanent magnet in insulated relation thereto to bear against said coil to wipe same to direct the flow of current from the brushes into and through said coil to induce the formation of magnetic poles therein adjacent to said brushes, the poles of said permanent magnet being staggered relative to said electromagnet poles to induce torque in said rotor, and means for connecting a source of D. C. current to the respective brushes.

2. A motor comprising a toroid coil formed of a core of ferrous material of substantially closed ring shape and of generally oval cross section and a wire wrapped about said core, said coil having wiping areas at the axial ends of the coil extending peripherally through 360° of the toroid coil, supporting means encircling the outer surface of the toroid coil and extending axially beyond same to support the coil, end plates engaging and supporting the axial extension of the supporting means in axially spaced relation to said wiping areas, said end plates having aligned shaft bearing openings, shafts extending through the respective end plates in axial alignment, a cylindrical permanent magnet mounted on the shafts inwardly of the plates and disposed within the toroid coil, means insulating said shafts from each other and from said magnet, brushes mounted on the respective shafts and extending radially in opposite directions into the respective spaces between the end plates and said respective wiping areas and respectively brushing said respective areas, the poles of said permanent magnet being staggered angularly with reference to the area of contacts of the respective brushes on said wiping areas, connections on the end plates for connection to a source of current, and means for conveying said current from the end plates into the respective brushes.

JOSEPH C. CLARK.

REFERENCES CITED

The following references are of record in the file of this patent:

UNITED STATES PATENTS

| Number | Name | Date |
|---|---|---|
| 264,982 | Weston | Sept. 26, 1882 |
| 433,758 | Zipernowsky et al. | Aug. 5, 1890 |
| 470,194 | Hosford | Mar. 8, 1892 |
| 554,365 | Guest | Feb. 11, 1896 |
| 1,093,983 | Eichberg | Apr. 24, 1914 |
| 1,862,248 | Wesnigk | June 7, 1932 |
| 2,131,436 | Howell | Sept. 27, 1938 |
| 2,161,953 | Dunham et al. | June 13, 1939 |
| 2,194,211 | Sansom | Mar. 19, 1940 |

OTHER REFERENCES

"Midget Motor" in Power Generation for March 1948, pp. 66, 67.